United States Patent
Carlson et al.

(10) Patent No.: US 6,961,309 B2
(45) Date of Patent: Nov. 1, 2005

(54) ADAPTIVE TCP DELAYED ACKNOWLEDGMENT

(75) Inventors: David G. Carlson, Rochester, MN (US); Paul R. Chmielewski, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 903 days.

(21) Appl. No.: 09/843,058

(22) Filed: Apr. 25, 2001

(65) Prior Publication Data

US 2002/0159396 A1 Oct. 31, 2002

(51) Int. Cl.[7] .............................................. H04L 12/26
(52) U.S. Cl. ...................... 370/235; 370/236
(58) Field of Search .............. 370/235–236, 370/249, 252–253, 410

(56) References Cited

U.S. PATENT DOCUMENTS

| | | | |
|---|---|---|---|
| 5,042,029 A | * | 8/1991 | Hayakawa .................. 370/231 |
| 5,227,775 A | | 7/1993 | Bruckert et al. |
| 5,519,699 A | | 5/1996 | Ohsawa |
| 5,528,605 A | * | 6/1996 | Ywoskus et al. ........... 714/749 |
| 5,612,949 A | | 3/1997 | Bennett |
| 5,793,768 A | | 8/1998 | Keshav |
| 5,802,106 A | | 9/1998 | Packer |
| 6,038,216 A | | 3/2000 | Packer |
| 6,038,606 A | * | 3/2000 | Brooks et al. .............. 709/235 |
| 6,049,833 A | | 4/2000 | Chan et al. |
| 6,215,769 B1 | * | 4/2001 | Ghani et al. ................ 370/230 |
| 6,449,631 B1 | * | 9/2002 | Takamoto et al. .......... 709/200 |
| 6,560,243 B1 | * | 5/2003 | Mogul ........................ 370/468 |
| 6,622,172 B1 | * | 9/2003 | Tam ............................ 709/232 |

* cited by examiner

*Primary Examiner*—Chi Pham
*Assistant Examiner*—Viet Le
(74) *Attorney, Agent, or Firm*—Schmeiser, Olsen & Watts, LLP

(57) ABSTRACT

This invention relates to reception and transmission of data over a network. More specifically, this invention relates to Transmission Control Protocol's delayed acknowledgment and improving transmission throughput by adaptively adjusting the use of delayed acknowledgment.

50 Claims, 3 Drawing Sheets

ADAPTIVE TCP DELAYED ACKNOWLEDGMENT

BACKGROUND OF THE INVENTION

1. Technical Field

This invention generally relates to reception and transmission of data over a network. More specifically, this invention relates to adaptive Transmission Control Protocol (TCP) delayed acknowledgment.

2. Background Art

The development of the EDVAC computer system of 1948 is often cited as the beginning of the computer era. Since that time, computer systems have evolved into extremely sophisticated devices, and computer systems may be found in many different settings. Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Communication between two computers or processes is facilitated by standard protocols. These protocols establish uniform means by which a sender can reliably transmit information to a receiver. However, the protocols establish the fundamental structures of communication, not how to optimally use them. Transmission Control Protocol/Internet Protocol (TCP/IP) is one such inter-process/inter-computer communication protocol.

Within the TCP/IP protocol suite used throughout the Internet, the Transmission Control Protocol (TCP) provides reliable end-to-end delivery of a stream of bytes over a network connection. Applications such as Hypertext Transfer Protocol (HTTP), File Transfer Protocol (FTP), and Telnet use TCP to reliably send and receive data over IP networks. The design of TCP includes an acknowledgment (ACK) scheme to guarantee that the data sent from one end of a connection is actually received by the other end. If the sender does not receive an ACK within a calculated time period, it will assume the data has been lost and retransmits the data.

In order to gain efficiencies both in network utilization and protocol processing overhead, the TCP standard provides for what is known as delayed ACKs. Delayed ACKs are important because the sender may transmit multiple segments of data, called packets, before a required ACK period lapsed on an earlier segment. The basic idea behind the delayed ACK strategy is that by not immediately sending an ACK for each packet received, it is possible to combine acknowledgment of the receipt of multiple packets into a single ACK.

Another means of reducing ACKs arises when applications that receive data quickly turn-around and send data back in the other direction. This situation allows the receiver to combine or "piggyback" an ACK with the data to be sent back thereby reducing protocol processing overhead by reducing the total number of packets to be processed.

For certain traffic patterns there are definite advantages when using delayed ACKs. However, for other traffic patterns the delayed ACK introduces 2 primary problems. First, delayed ACKs can introduce an unnecessary delay in the flow of data resulting in reduced throughput rates. According to the TCP standard, an ACK should not be delayed by more than 500 ms and, in fact, most implementations use a 200 ms maximum delay. In a one-directional bulk data transfer, introducing these 200 ms delays throughout the transfer can have a significant negative impact on the throughput realized. This is especially true when the sender does not anticipate receiving delayed ACKs. In such a case the sender may delay the entire length of proscribed time and then resend the data before an ACK is received. This introduces a large amount of delay and additional traffic in the communication channel.

A second problem introduced by using delayed ACKs is that a potentially significant amount of processing overhead is introduced to set a time-out timer and on timer expiration, to send the delayed ACK.

The net effect is that there are conditions where delayed ACKs enhance communication throughput and conditions where delayed ACKs inhibit communication throughput. What is needed is a system and method that overcomes these problems.

DISCLOSURE OF INVENTION

Therefore, what is needed to overcome these problems is the present invention which adaptively detects when delayed ACKs enhance or inhibit communication throughput, and adjusts the use of delayed ACKs to maintain an optimal communication throughput.

When communication between two processes commences, an embodiment of the present invention presumes that delayed ACKs will enhance communication throughput and enables use of delayed ACKs. Enabling use of delayed ACKs means that until conditions indicate that delayed ACKs will inhibit communication throughput, an embodiment of the present invention will attempt to use delayed ACKs for all data packets received. Disabling use of delayed ACKs means that until conditions indicate that delayed ACKs will enhance communication throughput, the present invention will send an ACK for each data packet received.

In order to determine when delayed ACKs will enhance or inhibit communication throughput, an embodiment of the present invention monitors certain traffic conditions. One condition monitored, when use of delayed ACKs is enabled, is the amount of time between receipt of a packet and the time when an ACK is sent for that packet. If a predetermined time period expires before the receipt of another packet, then use of delayed ACKs would not enhance the communication throughput and use of delayed ACKs is disabled.

Another traffic condition monitored, when use of delayed ACKs is disabled, is when the receiver is to reply to the received packet with data. The difference in time between the reply of data and the previous ACK sent is compared to a predetermined time period. If the time difference is less than the predetermined time period, then the use of delayed ACKs is enabled.

Another traffic condition monitored, when the use of delayed ACKs is disabled, is when two data packets are sequentially received. The difference in time between the receipt of the current packet and the previous ACK sent is compared to a predetermined time period. If the time difference is less than the predetermined time period, then the use of delayed ACKs is enabled.

The foregoing and other features and advantages of the present invention will be apparent in the embodiments of the present invention, as illustrated in the accompanying drawings.

BRIEF DESCRIPTION OF DRAWINGS

The embodiments of the present invention will hereinafter be described in conjunction with the appended drawings, wherein like designations denote like elements, and.

BEST MODE(S) FOR CARRYING OUT THE INVENTION

The embodiments of the present invention solve the problems described in the Disclosure of Invention by adaptively detecting when delayed ACKs enhance or inhibit communication throughput, and adaptively enables or disables the use of delayed ACKs to maintain an optimal communication throughput.

Figure 1:
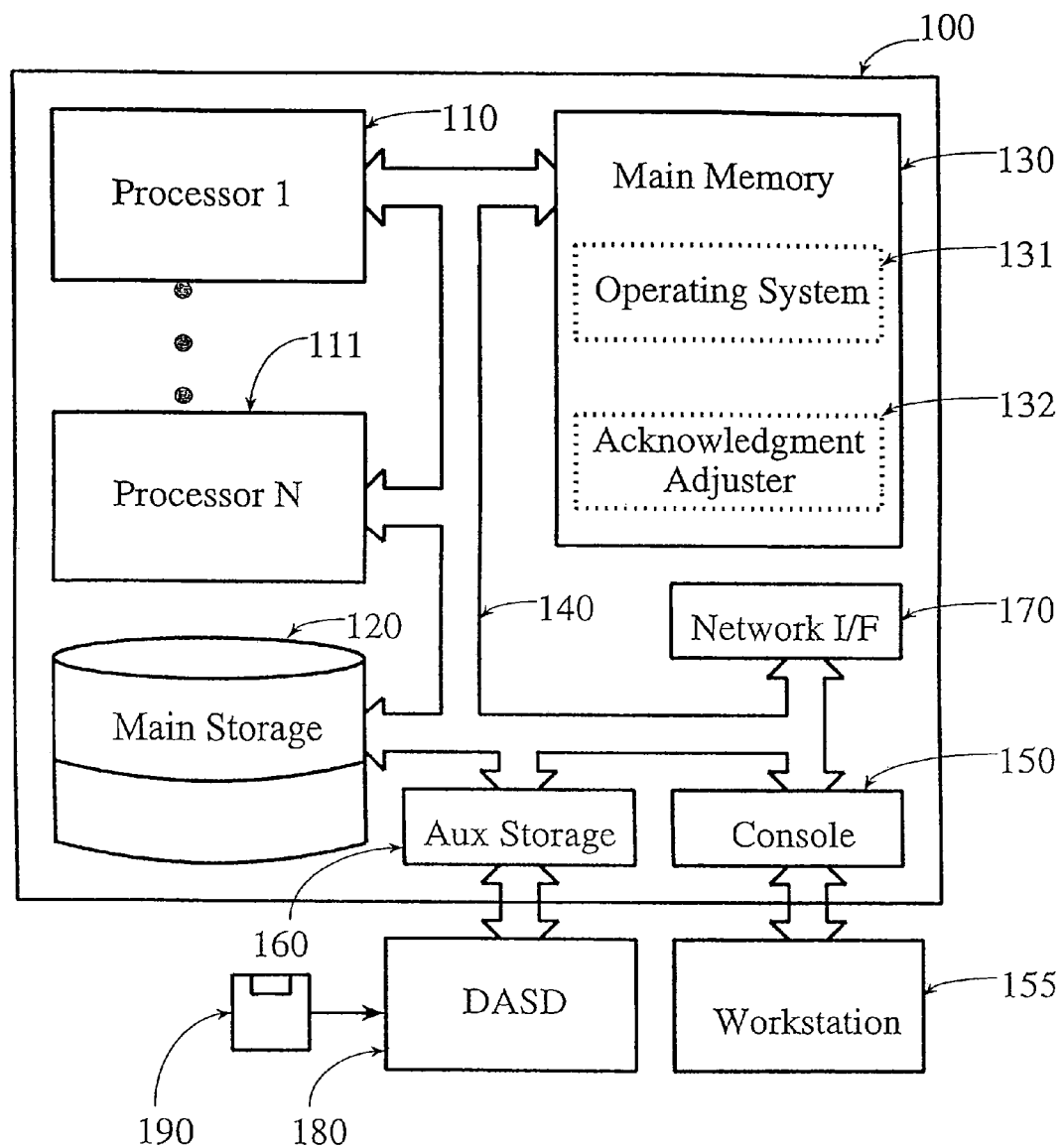
FIG. 1 is a computer system in accordance with an embodiment of the present invention.

Turning now to FIG. 1, a computer system 100 in accordance with an embodiment of the present invention includes N processors 110 through 111, a main storage 120, an auxiliary storage interface 160, a network interface 170, a Direct Access Storage Device (DASD) 180 used for example with a read/writeable medium such as floppy disk 190 or a compact disk, a bus 140, and a memory 130 that includes multiple locations for containing various software programs and data. In this example, memory 130 includes an operating system 131 and an acknowledgment adjuster 132. These memory items are discussed with reference to other figures.

Processors 110 through 111 perform computation and control functions of system 100. All processors associated with system 100 may each individually comprise a single integrated circuit, such as a microprocessor, or may comprise any suitable number of integrated circuit devices and/or circuit boards working in cooperation to accomplish the functions of a central processing unit. All processors are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and processors 110 may be distributed across several different computers that collectively comprise system 100. Computer system 100 of FIG. 1 simply illustrates many of the salient features of the invention, without limitation regard to the physical location of Processors 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and material for connecting computer systems and components will be readily adapted for use with the present invention. This would include those methods and materials not presently known but developed in the future.

Console 150 allows human users to communicate with system 100, normally through a workstation 155. Workstation 155 may be a computer system such as a personal computer. Although system 100 as depicted in FIG. 1 contains only a single workstation 155, it should be understood that the actual number of workstations attached to system 100 will be a function of system design and user preference. Workstation 155 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a disk drive which is capable of reading and writing programs or data on a disk. DASD 180 may also be any other type of DASD known to those skilled in the art. This would include CD-ROM drives, hard disk drives, optical drives, etc.

Network interface 170 is used to connect other computer systems to computer system 100 in networked fashion. One particular networking configuration will be shown in FIG. 2. The present invention applies equally no matter how computer system 100 may be connected to other computer systems and/or workstations, regardless of whether the connection is made using present-day analog and/or digital techniques or via some networking mechanism of the future.

It is important to note that while the present invention has been, and will continue to be, described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. The program product tangibly embodies a program of machine-readable instructions executable by a computer system having an operating system. The program product, in combination with a computer system, directs the computer system to perform the embodiments of the current invention and any steps taken by these embodiments. Examples of signal bearing media include recordable type media such as floppy disks (e.g., disk 190) and CD ROMS, and transmission type media such as digital and analog communication links, including wireless communication links.

Figure 2:
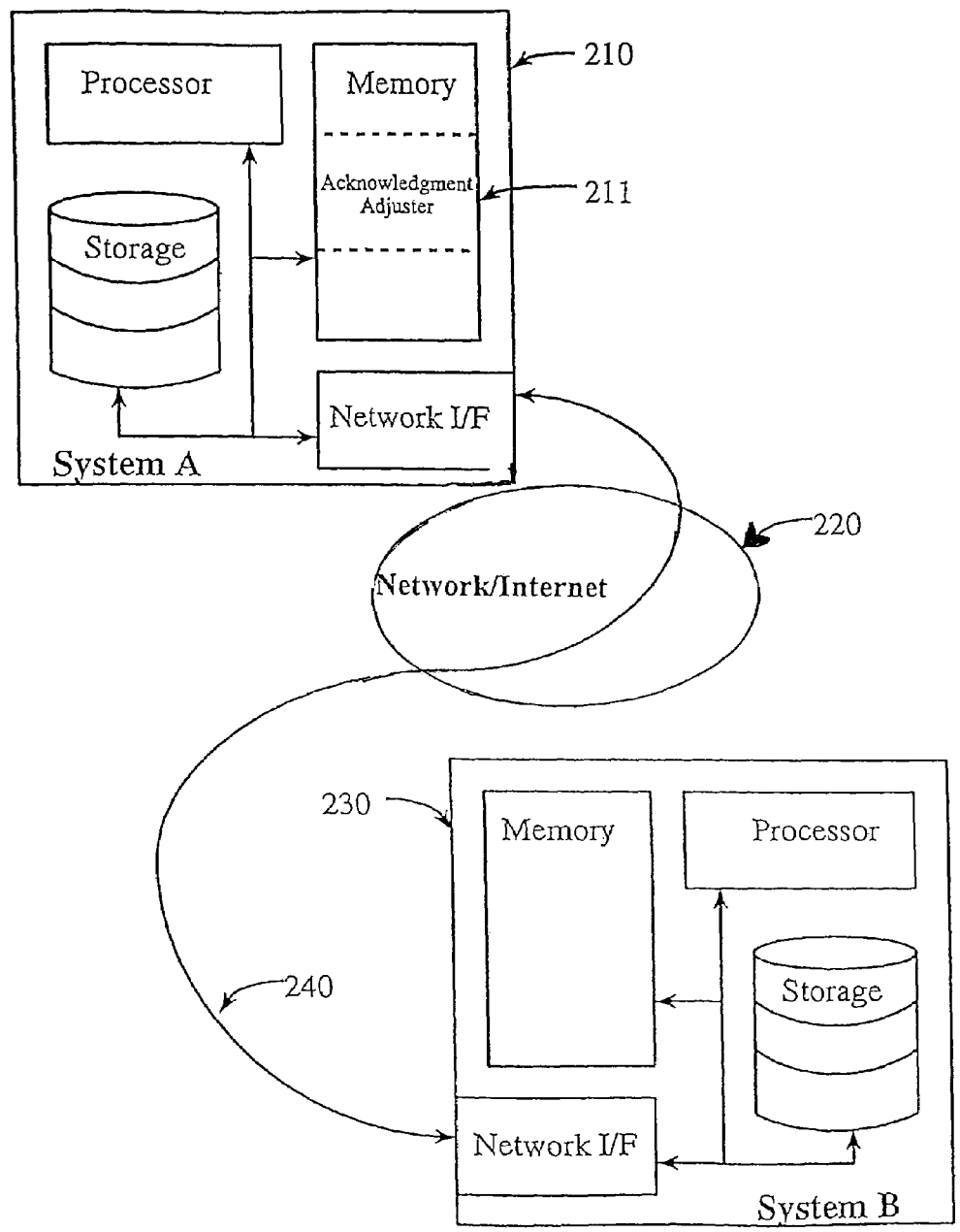
FIG. 2 is a computer network with at least two computers in accordance with an embodiment of the present invention.

FIG. 2 represents an embodiment of the invention where System A 210, which contains the acknowledgment adjuster 211, is connected to the Network/Internet 220. System B 230 is also connected to this Network/Internet 220. As illustrated by Connection 240, System A 210 and System B 230 have established a two-way communication connection between them. Thus, Connection 240 represents a flow of information between System A 210 and System B 230. This flow of data includes, among other things, data packets and the ACK of data packets.

For purposes of FIG. 2, assume that System A 210 has requested information from System B 230 and the appropriate communication connection 240 has been established. Further assume that System B 230 has commenced sending the requested information through the Network/Internet 220 to System A 210 over the communication connection 240.

While not a necessary condition for the invention, assume also that System A 210 commences by assuming that delayed ACKs will be used.

As the first data packet is sent over the connection 240, System A 210 will delay its ACK so that it may be combined with an ACK of a subsequent data packet. Because it is not necessary for System B 230 to wait for an ACK of a first data packet before it can send subsequent data packets, System B sends a second data packet before receiving acknowledgment of the first data packet. If System A 210 receives the second data packet within a predetermined amount of time, System A 210 acknowledges both the first and second data packets with a single ACK, thus employing the concept of delayed ACKs. If System B 230 receives the ACK of the first and second data packets within a specified amount of time, System B 230 does not need to resend those packets. Thus, data traffic is reduced and throughput is maintained at a high level.

If System A 210 had not received the second data packet within the predetermined amount of time, System A 210 would have replied with an ACK for the first data packet to System B 230. System A 210 would also have changed an internal state such that delayed ACKs would be discontinued until future conditions indicate that they would prove advantageous and ACK would be made immediately after receipt of a data packet. By immediately responding with an ACK for a data packet, System A 210 ensures that System B 230 receives the ACK before System B 230 assumes that the data packet was not received and re-sends the data packet. This prevents unnecessary data on the connection 240 and yields greater throughput.

When System A 210 is responding immediately to each received data packet, i.e. not using delayed ACKs, System A 210 monitors for conditions where it would be advantageous to use delayed ACKs. If System A 210 receives a data packet within a predetermined amount of time of a previous data packet, System A 210 sets an internal condition which causes it to use delayed ACKs for all subsequently received data packets.

Those skilled in the art will recognize that this invention applies equally if there are more than two computers connected and would equally apply over any type of networking environment. Those skilled in the art will further recognize that while in this example System B 230 does not have an acknowledgment adjuster, System B 230, as well as any other computers connected to the network, may contain and make use of an acknowledgment adjuster.

Figure 3:
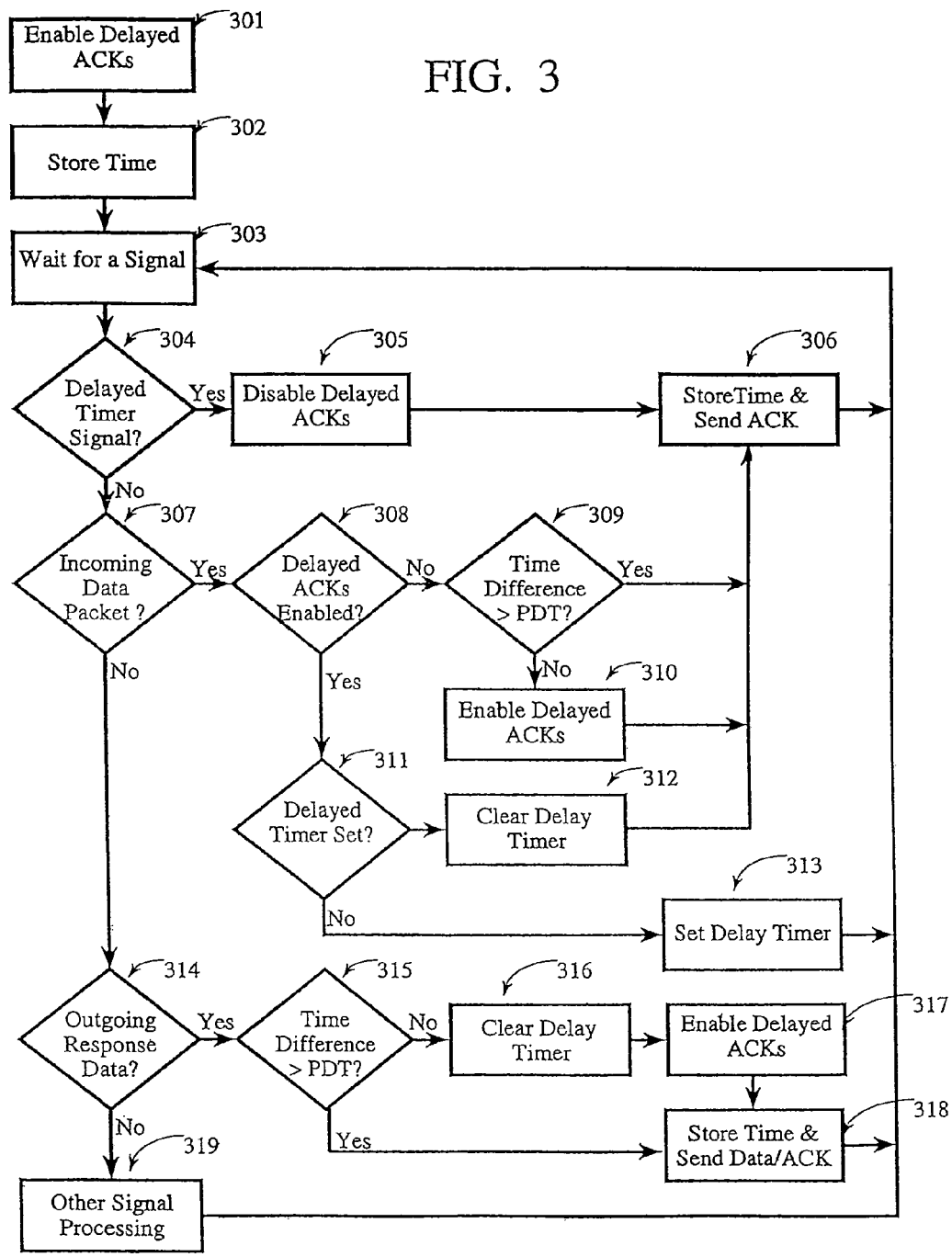
FIG. 3 is a flow chart describing the methods of enabling and disabling the use of delayed ACKs in accordance with an embodiment of the present invention.

FIG. 3 is a flow diagram on how the acknowledgment adjuster adaptively adjusts the use of delayed ACKs. The application of the flow diagram in FIG. 3 assumes conditions similar to those described in relation to FIG. 2, namely that a communication connection, such as connection 240, has been established between two systems, such as System A 210 and System B 230, that System B 230 has commenced sending data packets to System A 210, and System A 210 is using the acknowledgment adjuster. For purposes of the discussion of FIG. 3, each numbered item will be referred to as 'Step' followed by its number. This will be true if the 'step' is a rectangle or diamond. To understand the diagram it is helpful to generally see the rectangles as discrete processing steps and the diamonds as decisional steps. Step 301 represents a initial, default step of enabling the use of delayed ACKs. Those skilled in the art will recognize that other embodiments of the present invention may initially disable the use of delayed ACKs. Step 302 stores the current time as the last acknowledgment time (LastACK). The purpose of Step 302 is to enable the acknowledgment adjuster to operate properly as the first data packet is received.

Step 303 represents a period of time when a system is able to receive a signal indicating a data packet has arrived, a delay time has expired, an outgoing response is ready to be sent, or some other communication event. Those skilled in the art will recognize that this 'step' does not require that the system remain idle until an event arrives, but the system is able to perform other tasks which may be scheduled within the system. When an event is received, the system proceeds to Step 304.

Step 304 represents a decisional box which determines whether a received event was initiated by a delay timer. Whenever a delay timer event is received, that event indicates that a data packet was received, that the use of delayed ACKs is enabled, and the data packet has not yet been acknowledged. TCP/IP requires that a data packet be acknowledged within a specified amount of time or the sender of that data packet must assume that the data was lost and needs to resend that data packet. In order to prevent multiple copies of the same data packet being sent over the network when the use of delayed ACKs is enabled, the present invention sets a delay timer after the receipt of a data packet. If the delay timer expires, it sends a delay timer event to the system which will force the system to send a ACK within the time period allowed to acknowledge that data packet so that a duplicate data packet will not be sent. When an event is initiated by a delay timer, the acknowledgment adjuster will proceed to Step 305 where the use of delayed ACKs will be disabled. Step 305 represents the step of disabling the use of delayed ACKs. Step 306 stores the current time as LastACK and then acknowledges any data packet which has been received but not acknowledged.

Step 307 represents a decisional box that determines whether the received event is a data packet. If the event is the receipt of a data packet, the acknowledgment adjuster will proceed to Step 308. Step 308 represents a decisional step to determine whether the use of delayed ACKs is enabled or not. From Step 308, the acknowledgment adjuster proceeds to Step 309 if the use of delayed ACKs is disabled, or to Step 311 if the use of delayed ACKs is enabled.

Step 309 represents a decisional step to determine whether the time difference between the receipt of the current data packet and the last acknowledgment time, lastACK, is greater than a predetermined time period. predetermined time period represents is the measure against which the acknowledgment adjuster determines whether to enable the use of delayed ACKs or not. If, in Step 309, the amount of time is greater than the predetermined time period, the acknowledgment adjuster does not enable the use of delayed ACKs, but proceeds to Step 306 as described above. If the amount of time is less than or equal to the predetermined time period, the acknowledgment adjuster proceeds to Step 310. Step 310 represents the step where the acknowledgment adjuster enables the use of delayed ACKs because the amount of time between the receipt of the current data packet and the last acknowledgment time, lastACK, is less than or equal to a predetermined time period. The acknowledgment adjuster then proceeds to Step 306 as described above. Those skill in the art will realize that in another embodiment of this invention the acknowledgment adjuster could also proceed to Step 313 and delay acknowledgment for the current data packet rather than waiting for the next data packet to begin use of delayed acknowledgments.

Step 311 represents a decisional process to determine whether a delayed timer has been started. To arrive at Step 311 the event must have been a received data packet and the use of delayed ACKs is enabled. As described above, a delay timer is started when acknowledgment of a data packet has been delayed. The acknowledgment adjuster proceeds to Step 312 if a delay timer has been started, otherwise to Step 313. In Step 312 the acknowledgment adjuster clears the delay timer. This delay timer will not be needed because the acknowledgment adjuster then proceeds to Step 306 where the current and previous data packets are acknowledged. This combining of a previous data packet acknowledgment with a subsequent data packet acknowledgment is one example of a delayed ACK. Step 313 represents the step within the acknowledgment adjuster where it has determined that acknowledgment of the current data packet will be delayed. Thus, a delay timer is started, set to expire in a predetermined time period unless a subsequent data packet is received or an outgoing response occurs before the expiration of the delay timer.

Step 314 represents a decisional step to determine whether the event is an outgoing response data packet. If the event is an outgoing response data packet, the acknowledgment adjuster proceeds to Step 315, otherwise it proceeds to Step 319. Step 315 represents a decisional step to determine whether the time difference between the current time and the last acknowledgment time, lastACK, is greater than a predetermined time period. If the time difference is greater than a predetermined time period, the acknowledgment adjuster proceeds to Step 318. Otherwise, the acknowledgment adjuster proceeds to Step 316. At Step 316 the acknowledgment adjuster clears the delay timer if it exists. The acknowledgment adjuster clears an existing delay timer because a delayed acknowledgment will be combined and sent with the outgoing response data, which represents another example of delayed ACKs. The acknowledgment adjuster then proceeds to Step 317 where the use of delayed ACKs is enabled if it is not already enabled. Step 318 represents the step of saving the current time as the last acknowledgment time, combining any delayed acknowledgment with the outgoing response data, and sending the outgoing response data.

Step 319 represents other events which may occur within the system but are not handled by the acknowledgment adjuster.

As shown in the previous examples, the preferred embodiments of the present invention describe apparatuses and methods for adaptively adjusting the use of delayed ACKs to achieve more efficient communication throughput. Certain traffic conditions are monitored which cause the Adaptive Program to either enable or disable the use of delayed ACKs. When use of delayed ACKs is disabled and by monitoring the network traffic the present invention determines that delayed ACKs would enhance communication throughput, use of delayed ACKs is enabled. When use of delayed ACKs is enabled and by monitoring the network traffic the present invention determines that delayed ACKs inhibit communication throughput, use of delayed ACKs is disabled.

While the present invention has been particularly shown and described with reference to preferred embodiments thereof, it will be understood by those skilled in the art that various changes in form and details may be made therein without departing from the spirit and scope of the invention. It should be noted that methods are not necessarily in the order given, unless an order is necessary.

What is claimed is:

1. An apparatus for improving Transmission Control Protocol (TCP) performance, the apparatus comprising:
   at least one processor;
   a memory coupled to the at least one processor; and
   an acknowledgment adjuster in the memory, the acknowledgment adjuster monitoring
   network transmission traffic and adjusting use of delayed acknowledgments (ACKs) based on the network transmission traffic,
   wherein the acknowledgment adjuster:
   determines a time period selected from the group consisting of a first time period and a second time period, the first time period being a time period between when a last ACK for a previous packet was sent and when a current packet is received, the second time period being a time period between when the last ACK was sent and when a data packet is to be sent in return to a previous packet; and
   if the time period is less than a predetermined time period:
   discontinues sending an ACK after each received packet; and
   sends a delayed ACK after at least one received packet.

2. The apparatus of claim 1 wherein the time period is the first time period, and wherein the at least one received packet is the current packet.

3. The apparatus of claim 1 wherein the time period is the first time period, and wherein the previous packet and the current packet are full sized packets.

4. An apparatus for improving Transmission Control Protocol (TCP) performance, the apparatus comprising:
   at least one processor;
   a memory coupled to the at least one processor; and
   an acknowledgment adjuster, the acknowledgment adjuster monitoring time delays in TCP traffic, these delays occurring between
   the last acknowledgment time of a first data packet and receipt of a subsequent data packet, and
   the last acknowledgment time of a first data packet and a response data packet sent in reply to a first data packet, and
   the receipt of a first data packet and the ACK of that first data packet; and the acknowledgment adjuster adjusting use of delayed ACKs based on time delays which occur in the TCP traffic such that if the use of delayed ACKs is disabled and the time delay between the last acknowledgment time and receipt of a subsequent data packet is less than a predetermined time period, use of delayed ACKs is enabled; or
   if the use of delayed ACKs is disabled and the time delay between the last acknowledgment time and a reply to the first data packet with a response data packet is less than a predetermined time period, use of delayed ACKs is enabled; or
   if the use of delayed ACKs is enabled and the delay in sending an ACK in response to a first data packet exceeds a predetermined time period, use of delayed ACKs is disabled.

5. The apparatus of claim 4 wherein the acknowledgment adjuster stores the current time as the last acknowledgment time when an ACK is sent in response to a data packet received.

6. The apparatus of claim 4 wherein the acknowledgment adjuster stores the current time as the last acknowledgment time when an ACK is combined and sent with a response data packet in reply to a first data packet.

7. The apparatus of claim 4 wherein the predetermined time period is 200 milliseconds.

8. The apparatus of claim 4 where the acknowledgment adjuster adjusts use of delayed ACKs based on time delays which occur in the TCP traffic such that if the use of delayed ACKs is disabled and the time delay between the last acknowledgment time and receipt of a subsequent data packet is less than a predetermined time period further:
   obtains the difference in time between the last acknowledgment time and the current time when receiving a data packet,
   compares that difference in time to a predetermined time period, and
   if the difference in time is less than the predetermined time period, uses delayed ACKs on subsequent data packets.

9. The apparatus of claim 4 wherein the acknowledgment adjuster adjusts use of delayed ACKs based on time delays which occur in the TCP traffic such that if the use of delayed ACKs is disabled and the time delay between the last acknowledgment time and a reply to the first data packet with a response data packet is less than a predetermined time period further:
   obtains the difference in time between the last acknowledgment time and the current time when a response data packet is to be sent in reply to a previous data packet,
   compares that difference in time to a predetermined time period, and
   if the difference in time is less than the predetermined time period, enables use of delayed ACKs on subsequent data packets.

10. The apparatus of claim 4 wherein the acknowledgment adjuster adjusts use of delayed ACKs based on time delays which occur in the TCP traffic such that if the use of delayed ACKs is enabled and the delay in sending an ACK in response to a first data packet exceeds a predetermined time period further:
    starts a delay timer, set to expire after a predetermine amount of time, when a first data packet is received and acknowledgment of that first data packet is delayed, and
    if that delay timer expires, sends an ACK for the first data packet and disables use of delayed ACKs, or
    if a subsequent data packet is received before the delay timer expires, clears the delay timer and sends a delayed ACK for both the first data packet and the subsequent data packet, or
    if a response data packet is to be sent in reply to a first data packet before the delay timer expires, clears the delay timer and combines and sends a delayed ACK with the response data packet.

11. The apparatus of claim 10 where the acknowledgment adjuster sends a delayed ACK for both the first data packet and the subsequent data packet further:
    stores the current time as the last acknowledgment time.

12. The apparatus of claim 10 where the acknowledgment adjuster sends an ACK for the first data packet further:
    stores the current time as the last acknowledgment time.

13. The apparatus of claim 10 where the acknowledgment adjuster sends a delayed ACK with the response data packet further:
    stores the current time as the last acknowledgment time.

14. The apparatus of claim 10 where the predetermined time period is 200 milliseconds.

15. A method for improving Transmission Control Protocol (TCP) performance, the method comprising the steps of:
    monitoring traffic on a TCP connection; and
    adjusting use of delayed acknowledgments (ACKs) based on the traffic,
    wherein: the step of monitoring traffic on a TCP connection comprises the step of determining if an ACK was not sent during a predetermined time period after a first packet was received; and the step of adjusting use of delayed ACKs based on the traffic comprises the step of sending an ACK after each received packet if an ACK was not sent during a predetermined time period after a first packet was received,
    wherein the step of sending an ACK after each received packet if an ACK was not sent during a predetermined time period after a packet was received further comprises the steps of:
    determining if a time period is less than the predetermined time period, the time period being a first time period or a second time period, the first time period being a time period between when a last ACK was sent and when a current packet is received, the second time period being a time period between when the last ACK was sent and when a data packet is to be sent in return to a previous packet; and
    if the time period is less than the predetermined time period:
       discontinuing sending an ACK after each received packet; and
       sending a delayed ACK after receiving at least one subsequent packet.

16. The method of claim 15 wherein the time period is the first time period, and wherein the at least one subsequent packet is the current packet.

17. The method of claim 15 wherein the time period is the first time period, and wherein the previous packet and the current packet are full sized packets.

18. A method for improving Transmission Control Protocol (TCP) performance, the method comprising the steps of:
    monitoring time delays in TCP traffic, these delays occurring between the last acknowledgment time of a first data packet and receipt of a subsequent data packet, and the last acknowledgment time of a first data packet and a response data packet sent in reply to a first data packet, and
    the receipt of a first data packet and the acknowledgment of that first data packet; and adjusting use of delayed ACKs based on time delays which occur in the TCP traffic such that if the use of delayed ACKs is disabled and the time delay between the last acknowledgment time and receipt of a subsequent data packet is less than a predetermined time period, use of delayed ACKs is enabled; or
    if the use of delayed ACKs is disabled and the time delay between the last acknowledgment time and a reply to the first data packet with a response data packet is less than a predetermined time period, use of delayed ACKs is enabled; or
    if the use of delayed ACKs is enabled and the delay in sending an ACK in response to a first data packet exceeds a predetermined time period, use of delayed ACKs is disabled.

19. The method of claim 18 wherein the step of monitoring time delays in TCP traffic further comprises storing the current time as the last acknowledgment time when an ACK is sent in response to a data packet received.

20. The method of claim 18 wherein the step of monitoring time delays in TCP traffic further comprises
storing the current time as the last acknowledgment time when an ACK is combined and sent with a response data packet in reply to a first data packet.

21. The method of claim 18 wherein the predetermined time period is 200 milliseconds.

22. The method of claim 18 wherein the step of adjusting use of delayed ACKs based on time delays which occur in the TCP traffic such that if the use of delayed ACKs is disabled and the time delay between the last acknowledgment time and receipt of a subsequent data packet is less than a predetermined time period further comprises:
obtaining the difference in time between the last acknowledgment time and the current time when receiving a data packet, comparing that difference in time to a predetermined time period, and if the difference in time is less than the predetermined time period, enable the use of delayed ACKs on subsequent data packets.

23. The method of claim 18 wherein the step of adjusting use of delayed ACKs based on time delays which occur in the TCP traffic such that if the use of delayed ACKs is disabled and the time delay between the last acknowledgment time and a reply to the first data packet with a response data packet is less than a predetermined time period further comprises:
obtaining the difference in time between the last acknowledgment time and the current time when a response data packet is to be sent in reply to a previous data packet, comparing that difference in time to a predetermined time period, and
if the difference in time is less than the predetermined time period, enable the use of delayed ACKs on subsequent data packets.

24. The method of claim 18 wherein the step of adjusting use of delayed ACKs based on time delays which occur in the TCP traffic such that if the use of delayed ACKs is enabled and the delay in sending an ACK in response to a first data packet exceeds a predetermined time period further comprises:
starting a delay timer, set to expire after a predetermine amount of time, when a first data packet is received and acknowledgment of that first data packet is delayed, and
if that delay timer expires, sending an ACK for the first data packet and disabling use of delayed ACKs, or if a subsequent data packet is received before the delay timer expires, clearing the delay timer and sending a delayed ACK for both the first data packet and the subsequent data packet, or if a response data packet is to be sent in reply to a first data packet before the delay timer expires, clearing the delay timer and combining and sending a delayed ACK with the response data packet.

25. The method of claim 24 wherein the step of sending a delayed ACK for both the first data packet and the subsequent data packet further comprises:
storing the current time as the last acknowledgment time.

26. The method of claim 24 wherein the step of sending an ACK for the first data packet further comprises:
storing the current time as the last acknowledgment time.

27. The method of claim 24 wherein the step of combining and sending a delayed ACK with the response data packet further comprises:
storing the current time as the last acknowledgment time.

28. The method of claim 24 wherein the predetermined time period is 200 milliseconds.

29. A program product, tangibly embodying a program of machine-readable instructions executable by a computer system, the program product comprising:
an acknowledgment adjuster program, the acknowledgment adjuster program monitoring traffic on a TCP connection and adjusting the use of delayed ACKs based on the traffic; and
signal bearing media bearing the acknowledgment adjuster program,
wherein the acknowledgment adjuster program:
monitors whether an ACK was not sent during a predetermined time period after a first packet was received; and
sends an ACK after each received packet if an ACK was not sent during a predetermined time period after a first packet was received.

30. The program product of claim 29 wherein the signal bearing media comprises transmission media.

31. The program product of claim 29 wherein the signal bearing media comprises recordable media.

32. The program product of claim 29 wherein the acknowledgment adjuster program monitoring traffic on a TCP connection and adjusting the use of delayed ACKs based on the traffic further comprises:
the acknowledgment adjuster program monitoring packet receipt frequency on a TCP connection and adjusting the use of delayed ACKs based on the packet receipt frequency.

33. The program product of claim 29 wherein the acknowledgment adjuster program:
determines if a first time period between when a last ACK was sent and when a current packet is received is less than the predetermined time period, and if a first time period between when a last ACK was sent and when a current packet is received is less than the predetermined time period:
discontinues sending an ACK after each received packet; and
sends a delayed ACK after at least one received packet; or
determines if a second time period between when a last ACK was sent and when a data packet is to be sent in return to a current packet is less than the predetermined time period, and if a second time period between when a last ACK was sent and when a data packet is to be sent in return to a current packet is less than the predetermined time period:
discontinues sending an ACK after each received packet; and
sends a delayed ACK after receiving at least one subsequent packet.

34. The program product of claim 33 wherein the at least one subsequent packet is the current packet.

35. A program product, tangibly embodying a program of machine-readable instructions executable by a computer system, the program product comprising:
an acknowledgment adjuster program, the acknowledgment adjuster program monitoring traffic on a TCP connection and adjusting the use of delayed ACKs based on the traffic; and
signal bearing media bearing the acknowledgment adjuster program,
wherein the acknowledgment adjuster program:
determines a time period selected from the group consisting of a first time period and a second time period, the first time period being a time period between when a last ACK for a previous packet was sent and when a current packet is received, the second time period being a time period between when a last ACK was sent and when a data packet is to be sent in return to a previous packet; and if the time period is less than a predetermined time period:
discontinues sending an ACK after each received packet; and
sends a delayed ACK after at least one received packet.

36. The program product of claim 35 wherein the time period is the first time period, and wherein the at least one received packet is the current packet.

37. The program product of claim 35 wherein the time period is the first time period, and wherein the previous packet and the current packet are full sized packets.

38. A program product, tangibly embodying a program of machine-readable instructions executable by a computer system, the program product comprising:
an acknowledgment adjuster program, the acknowledgment adjuster program monitoring time delays in TCP traffic, these delays occurring between the last acknowledgment time of a first data packet and receipt of a subsequent data packet, and
the last acknowledgment time of a first data packet and a response data packet sent in reply to a first data packet, and
the receipt of a first data packet and the ACK of that first data packet; and
the acknowledgment adjuster program adjusting use of delayed ACKs based on time delays which occur in the TCP traffic such that if the use of delayed ACKs is disabled and the time delay between the last acknowledgment time and receipt of a subsequent data packet is less than a predetermined time period, use of delayed ACKs is enabled; or
if the use of delayed ACKs is disabled and the time delay between the last acknowledgment time and a reply to the first data packet with a response data packet is less than a predetermined time period, use of delayed ACKs is enabled; or
if the use of delayed ACKs is enabled and the delay in sending an ACK in response to a first data packet exceeds a predetermined time period, use of delayed ACKs is disabled.

39. The program product of claim 38 wherein the signal bearing media comprises transmission media.

40. The program product of claim 38 wherein the signal bearing media comprises recordable media.

41. The program product of claim 38 wherein the acknowledgment adjuster program stores the current time as the last acknowledgment time when an ACK is sent in response to a data packet received.

42. The program product of claim 38 wherein the acknowledgment adjuster program stores the current time as the last acknowledgment time when an ACK is combined and sent with a response data packet in reply to a first data packet.

43. The program product of claim 38 wherein the predetermined time period is 200 milliseconds.

44. The program product of claim 38 where the acknowledgment adjuster program adjusts use of delayed ACKs based on time delays which occur in the TCP traffic such that if the use of delayed ACKs is disabled and the time delay between the last acknowledgment time and receipt of a subsequent data packet is less than a predetermined time period further:
obtains the difference in time between the last acknowledgment time and the current time when receiving a data packet, compares that difference in time to a predetermined time period, and
if the difference in time is less than the predetermined time period, uses delayed ACKs on subsequent data packets.

45. The program product of claim 38 wherein the acknowledgment adjuster program adjusts use of delayed ACKs based on time delays which occur in the TCP traffic such that if the use of delayed ACKs is disabled and the time delay between the last acknowledgment time and a reply to the first data packet with a response data packet is less than a predetermined time period further:
obtains the difference in time between the last acknowledgment time and the current time when a response data packet is to be sent in reply to a previous data packet,
compares that difference in time to a predetermined time period, and
if the difference in time is less than the predetermined time period, enables use of delayed ACKs on subsequent data packets.

46. The program product of claim 38 wherein the acknowledgment adjuster program adjusts use of delayed ACKs based on time delays which occur in the TCP traffic such that if the use of delayed ACKs is enabled and the delay in sending an ACK in response to a first data packet exceeds a predetermined time period further:
starts a delay timer, set to expire after a predetermine amount of time, when a first data packet is received and acknowledgment of that first data packet is delayed, and
if that delay timer expires, sends an ACK for the first data packet and disables use of delayed ACKs, or
if a subsequent data packet is received before the delay timer expires, clears the delay timer and sends a delayed ACK for both the first data packet and the subsequent data packet, or
if a response data packet is to be sent in reply to a first data packet before the delay timer expires, clears the delay timer and combines and sends a delayed ACK with the response data packet.

47. The program product of claim 46 where the acknowledgment adjuster program sends a delayed ACK for both the first data packet and the subsequent data packet further:
stores the current time as the last acknowledgment time.

48. The program product of claim 46 where the acknowledgment adjuster program sends an ACK for the first data packet further:
stores the current time as the last acknowledgment time.

49. The program product of claim 46 where the acknowledgment adjuster program sends a delayed ACK with the response data packet further:
stores the current time as the last acknowledgment time.

50. The program product of claim 46 where the predetermined time period is 200 milliseconds.

* * * * *